(12) United States Patent
Nakajima et al.

(10) Patent No.: US 6,588,542 B2
(45) Date of Patent: *Jul. 8, 2003

(54) BOREHOLE TOOL ACTUATING MECHANISM

(75) Inventors: Hiroshi Nakajima, Kanagawa-ken (JP); Tatsuki Endo, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 09/839,069

(22) Filed: Apr. 20, 2001

(65) Prior Publication Data

US 2001/0023791 A1 Sep. 27, 2001

Related U.S. Application Data

(63) Continuation-in-part of application No. 09/508,586, filed on Mar. 14, 2000.

(51) Int. Cl.[7] ................................................. G01V 1/40
(52) U.S. Cl. .................... 181/102; 181/105; 181/112; 181/122; 175/81; 175/83; 175/230; 367/35; 166/382; 166/206
(58) Field of Search ............................... 181/102, 105, 181/111, 112, 122, 139; 175/76, 81, 82, 83, 98, 230; 367/25, 35, 82, 86; 166/382, 206, 118, 98; 403/11, 41, 119, 2

(56) References Cited

U.S. PATENT DOCUMENTS

| | | | | |
|---|---|---|---|---|
| 4,432,143 A | * | 2/1984 | Moriarty et al. | 250/268 |
| 4,480,186 A | * | 10/1984 | Wolk | 166/113 |
| 4,563,757 A | | 1/1986 | Decorps et al. | |
| 4,575,831 A | | 3/1986 | Decorps et al. | |
| 4,616,703 A | * | 10/1986 | Laurent et al. | 166/214 |
| 4,987,969 A | | 1/1991 | Boyle et al. | |
| 5,200,581 A | | 4/1993 | Boyle et al. | |
| 5,511,272 A | * | 4/1996 | Belanger et al. | 166/113 |
| 5,913,670 A | * | 6/1999 | Anderson et al. | 43/4.5 |
| 6,315,075 B1 | * | 11/2001 | Nakajima | 166/206 |
| 6,457,896 B1 | * | 10/2002 | deDoes | 403/2 |
| 2002/0076263 A1 | * | 6/2002 | Rietz | 15/53.3 |

FOREIGN PATENT DOCUMENTS

GB  2252169 A  *  7/1992  ......... E21B/47/022

* cited by examiner

Primary Examiner—Robert E. Nappi
Assistant Examiner—Patrick Miller
(74) Attorney, Agent, or Firm—Robin Nava; Bridgitte L. Jeffery

(57) ABSTRACT

A borehole tool including a tool body having and an anchoring mechanism, the anchoring mechanism having a drive mechanism including a motor, drive shaft, and clutch; an anchor arm moveable between first and second positions relative to the tool body; a push rod connecting the anchor arm to the drive mechanism; and a spring acting to bias the arm into a first position relative to the tool body. The push rod extends through the clutch mechanism and is engaged by the spring to bias the arm into the first position, and is also driven by the drive mechanism through the clutch to move the arm between the first and second position. The push rod may be connected to the anchor arm by a link. Measurement devices may be used to determine the position of the anchor arm or the tool body.

31 Claims, 6 Drawing Sheets

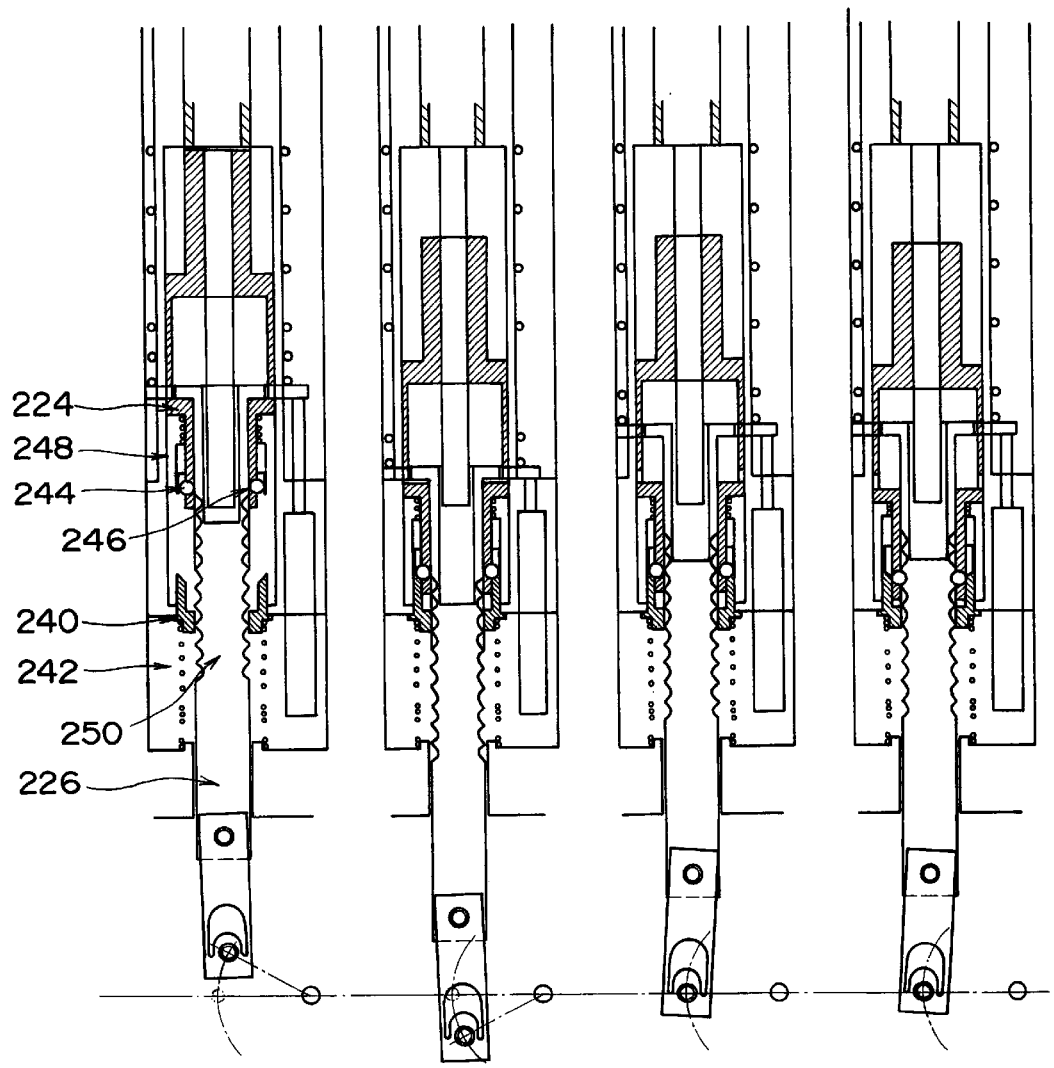

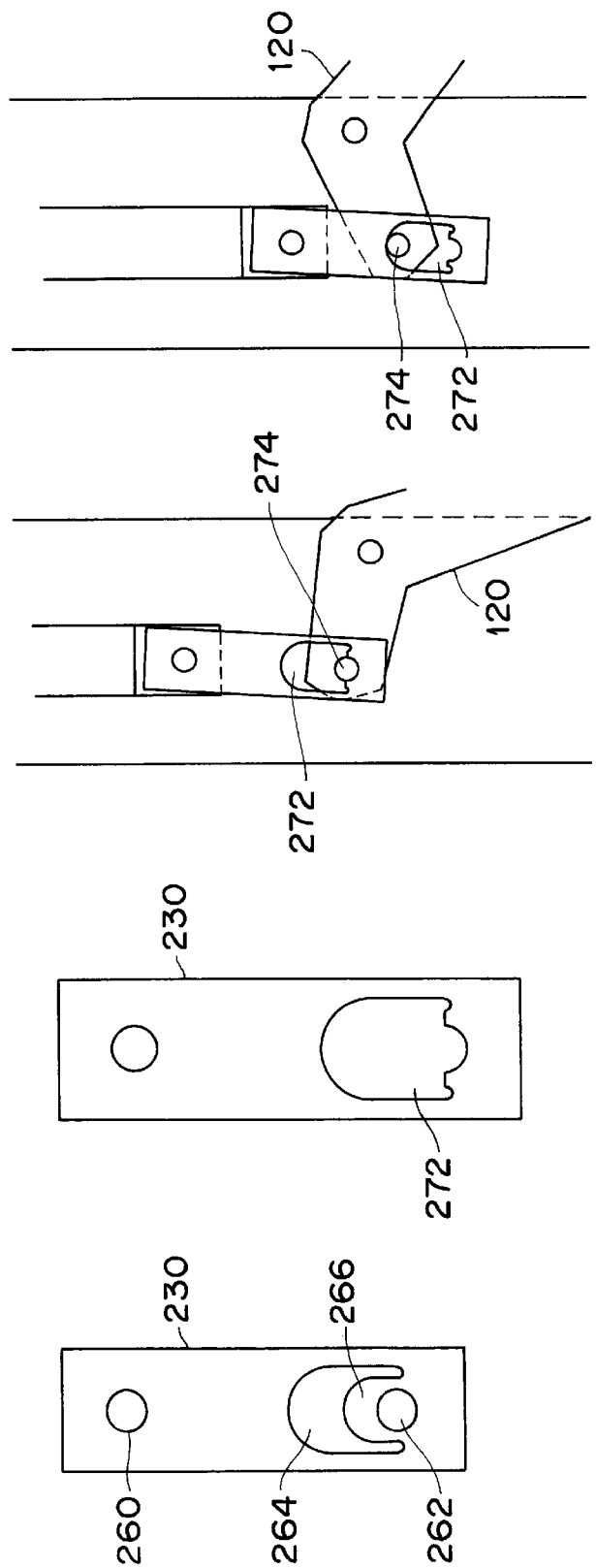

BOREHOLE TOOL ACTUATING MECHANISM

This application is a continuation-in-part application of co-pending and commonly assigned U.S. patent application Ser. No. 09/508,586 file Mar. 14, 2000.

TECHNICAL FIELD

The present invention relates to borehole logging tools, and in particular to aspects of an actuating mechanism urging a borehole logging tool against the wall of a borehole.

BACKGROUND ART

Borehole logging tools are known for performing measurements in boreholes to evaluate surrounding underground formations and often contact between the tool and the borehole is necessary to perform the desired measurement. This contact can be provided by anchoring the tool to a borehole wall during a measurement operation through the use of an anchoring arm. It may be necessary to make measurements at a number of levels in a borehole so the anchoring arm must be released to allow the tool to be moved and the anchoring arm then re-engaged at the next level. The time taken for the anchor to release and to re-engage can be a significant factor in the time taken to make a measurement at each level. An anchor arm that can be anchored and released in a relatively short time is desirable.

For example, multi-shuttle seismic tools are known that comprise a number shuttles linked together by means of a cable and logged through a borehole while seismic signals are generated at the surface. At each measurement level, each shuttle is anchored to the wall of a borehole during a measurement operation by means of an anchoring arm. As the time required to anchor and release each shuttle increases, the cost of performing the measurement operation increases and the possibility of the tool becoming encumbered in the borehole increases. In Schlumberger's Combinable Seismic Imager tool (CSI) the anchoring arm of each shuttle extended under spring bias and a drive motor is used to provide the anchoring force or retraction. Aspects of the CSI are described in U.S. Pat. Nos. 4,563,757; 4,575,831; 4,987,969; and 5,200,581. In patents '757 and '831 relate to the anchoring mechanism and procedure. A schematic figure from the patents is shown in FIG. 1. This prior art arrangement includes a motor 35, an output reducer 36 with an electromagnetic brake 37 and an output shaft to a coupling device 39 comprising a clutch 50, a mechanical logic 51 and torque limiter 54. The mechanical logic 51 includes studs located in helical, V-shaped, cam slots that serve to bring the clutch into engagement on operation of the motor. Drive is transmitted to a push rod 34 connected to the anchoring arms 31, 32 by means of a ball screw 40 and nut 41. The anchoring arms are urged away from the tool body 29 by a leaf spring 43 which is fixed to the tool body 29 and bears upon the arm 31. When in the open position, a pad 30 at the end of the arms 31, 32 engages the borehole wall and causes the tool body 29 to be pushed against the opposite side of the borehole where it can be anchored for use. The motor 35 is used to provide the extra anchoring force to the arms 31,32 and to withdraw the arms when the tool is run in or pulled out of the borehole. When the tool is to be moved to a different level, the action of the clutch 50 allows the motor to be disengaged and the arms held only by the force of the leaf spring 43.

An object of the present invention is a tool which has an anchoring arm which can be anchored and released in a relatively short time, and a further object is a tool which has a relatively compact anchoring arm. Another object is a borehole tool in which measurements relating to the anchoring mechanism or tool body position can be made. A further object is an anchoring mechanism that can operate after being loosed from an encumbered or jammed position.

DISCLOSURE OF INVENTION

The present invention provides a borehole tool comprising a tool body having an anchoring mechanism, the anchoring mechanism comprising a) a drive mechanism including a motor, a drive shaft and a clutch mechanism; b) an anchoring arm moveable between first and second positions relative to the tool body; and c) a push rod extending through the clutch mechanism connecting the anchoring arm to the drive mechanism; the push rod engaging a spring which acts to bias the arm into the first position, and driveably connecting the drive mechanism through the clutch such that the arm can be moved between the first and second positions.

In another embodiment, the present invention provides a borehole tool comprising a tool body having an anchoring mechanism comprising a) a drive mechanism including a motor, a drive shaft and a clutch; b) an anchoring arm moveable between first and second positions relative to the tool body; c) a push rod connecting the anchoring arm to the drive mechanism through a link; and d) a spring acting to bias the arm into a first position relative to the tool body; characterised in that the push rod extends through the clutch mechanism and is engaged by the spring to bias the arm into the first position, and is also driven by the drive mechanism through the clutch to move the arm between the first and second positions.

The present invention provides a borehole tool comprising a tool body having an anchoring mechanism comprising a) a drive mechanism including a motor, a drive shaft and a clutch; b) an anchoring arm moveable between first and second positions relative to the tool body; c) a push rod connecting the anchoring arm to the drive mechanism through a link; and d) a spring acting to bias the arm into a first position relative to the tool body; and e) at least one measurement device; characterised in that the push rod extends through the clutch mechanism and is engaged by the spring to bias the arm into the first position, and is also driven by the drive mechanism through the clutch to move the arm between the first and second positions.

In one embodiment, the present invention provides a link for connecting an anchoring arm to a borehole tool comprising at least one hole for affixing a fastener, an orifice for mounting a pivot, a cutout area, and a breakage area.

The invention is applicable to any type of borehole tool that requires the tool body to be urged against the borehole wall. The provision of the push rod extending through the clutch mechanism allows the overall length of the anchoring mechanism to be reduced over that provided by the prior art device.

A ball-bearing clutch can be used which comprises a collar having a number of balls that engage in grooves in the push rod to allow the drive mechanism to move the arm. A spring-loaded retaining ring can be provided to hold the balls in a driving position in the grooves when engaged by the collar.

The drive shaft is typically a drive screw and a nut is used to transmit the driving force to the push rod. Driving force can be applied either through the clutch or by bearing surfaces on the nut which engage directly extensions of the push rod. The two mechanisms can be used to provide reversible drive to the push rod.

The spring can be a coil spring that is located in the tool body around the drive mechanism. Other arrangements of springs or resilient biasing means can be used to urge the arm into the first position.

The anchor arm can be mounted on a pivot on the tool body with the first position being extending away from the tool body and the second position being along the tool body. Thus, the spring can be used to urge the arm away from the tool body and the motor used to provide further drive in this direction for anchoring force, or to provide a counteracting drive to withdraw the arm to the tool body. By reversing the drive to release the clutch, the arm can be held under spring force alone while the tool is moved in the borehole. The pivot can be placed in a link that connects the arm to the drive mechanism, the link having a propensity to fail in a predefined arrangement.

A measurement device can be used to indicate the position of the arm after movement. A measurement device attached to the push rod can be used to measure contact between the anchor arm and the borehole wall. A measurement device can be used to measure the contact force asserted on the borehole wall by the anchor arms. A measurement device can be used to detect forces that indicate the position of the anchor arm. A measurement device can be used to determine the orientation of the tool or borehole wall in a deviated wellbore.

BRIEF DESCRIPTION OF DRAWINGS

FIGS. 4A through 4D show the positions of the parts of the actuating mechanism of the shuttle of FIGS. 3A and 3B during various stages of deployment.

FIGS. 5A through 5D show detailed views of the link.

DETAILED DESCRIPTION

Figure 1:
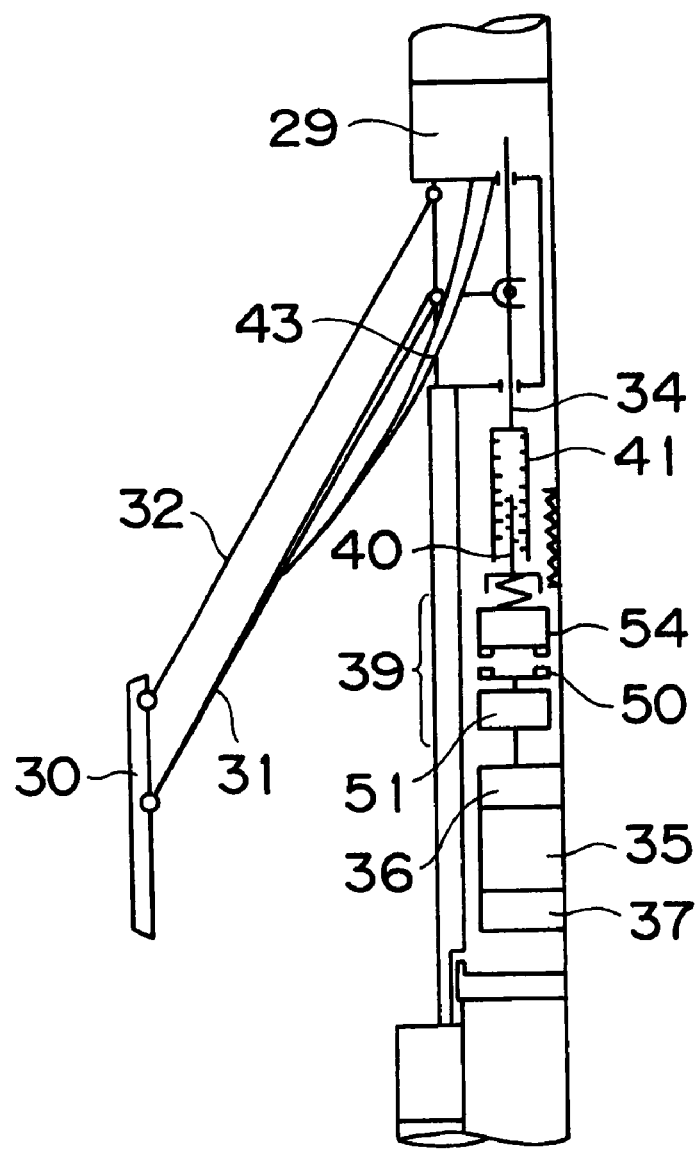
FIG. 1 shows a schematic view of a prior art tool.
Figure 2:
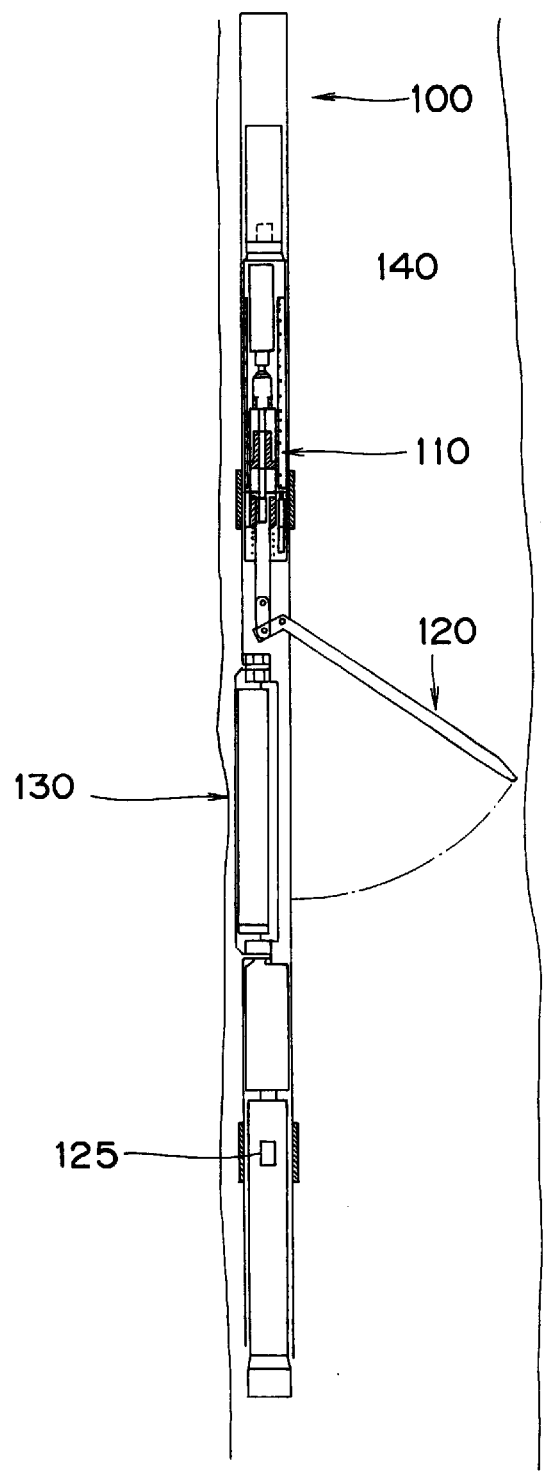
FIG. 2 shows a schematic view of a shuttle seismic logging tool incorporating the present invention.

The present invention finds particular application in multi-shuttle seismic logging tools. Such tools are used in vertical seismic profile (VSP) surveys and comprise a number of identical or similar shuttles connected in end-to-end fashion by cable. A single shuttle is shown in FIG. 2 that comprises a tool body 100 and an anchoring mechanism 110 including an anchoring arm 120. In use, a number of these shuttles, from 2 to 20, typically 4 to 8, are connected together and logged through the borehole 140.

Figure 3A:
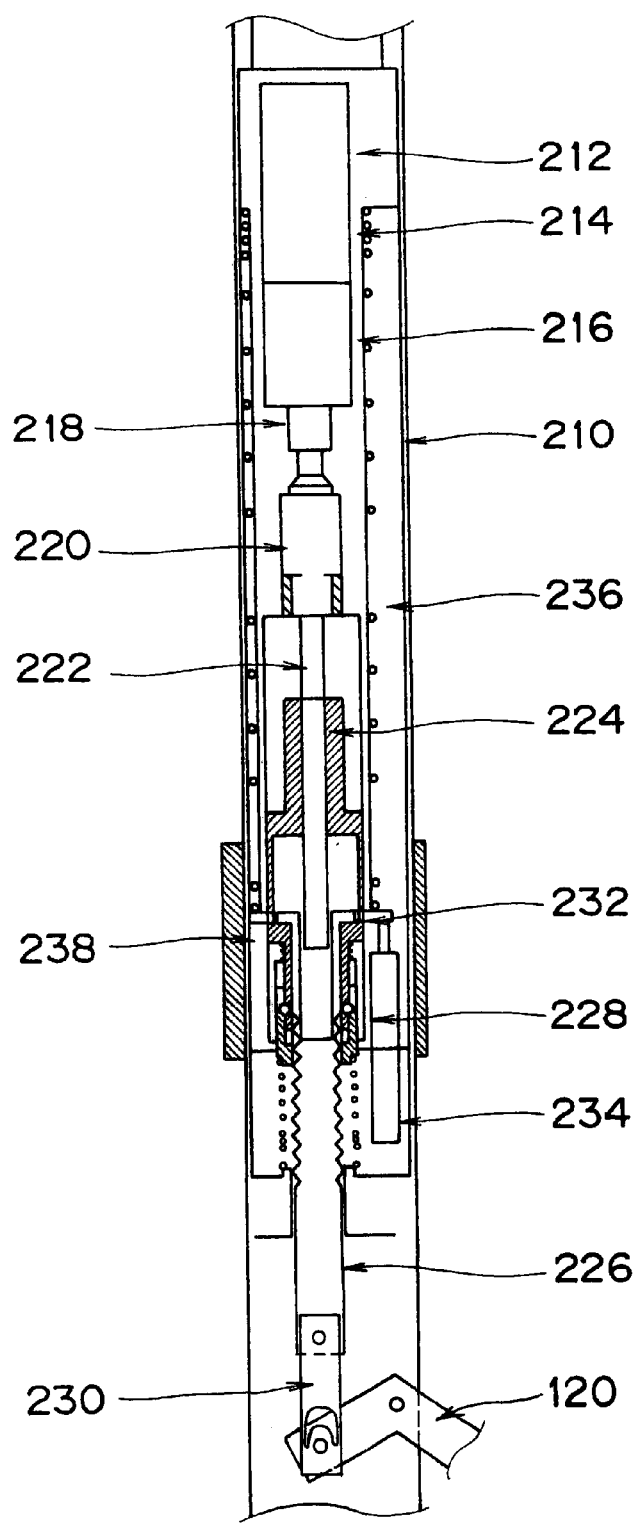
FIGS. 3A and 3B show a detailed view of a part of the shuttle shown in FIG. 2 and use of measurement devices therein.

FIG. 3A shows a detailed view of the anchoring mechanism 110. The mechanism includes a permanent magnet (or electromagnet) brake 212, motor 214 and reducer arrangement 216 housed in the shuttle body 210. The output drive from the reducer 216 connects through a joint 218 and bearing 220 to a ball screw 222. The ball screw 222 drives a nut 224. The end of the screw 222 projects into the hollow end of a push rod 226 and the end of the nut 224 engages the outer surface of the push rod 226 through a clutch mechanism 228 which is described in more detail below. The end of the push rod 226 is connected to a link 230 through which it drives the anchoring arm of the shuttle 120. The inner end of the push rod 226 is formed into a base section 232 that fits inside the nut 224. A compression spring 236 is located around the motor/ball screw mechanism inside the shuttle body and acts on the base section 232 so as to normally urge the push rod 226 and hence the arm, outwards. The extension of the push rod 226 under by the spring 236 is limited by the position of the nut 224 on the screw 222 such that operating the motor 214 to move the nut 224 causes the push rod 226 to move out due to the spring 236 or be pulled in by the action of the nut 224.

The base section 232 can have extensions outside the nut 224 to provide a connection to a measurement device 234 for the position of the push rod 226. This measurement device 234, preferably a potentiometer or a linear variable differential transformer, can be used for a caliper measurement in the borehole by measuring the position of the push rod when it is fixed to the anchor arm.

Figure 3B:
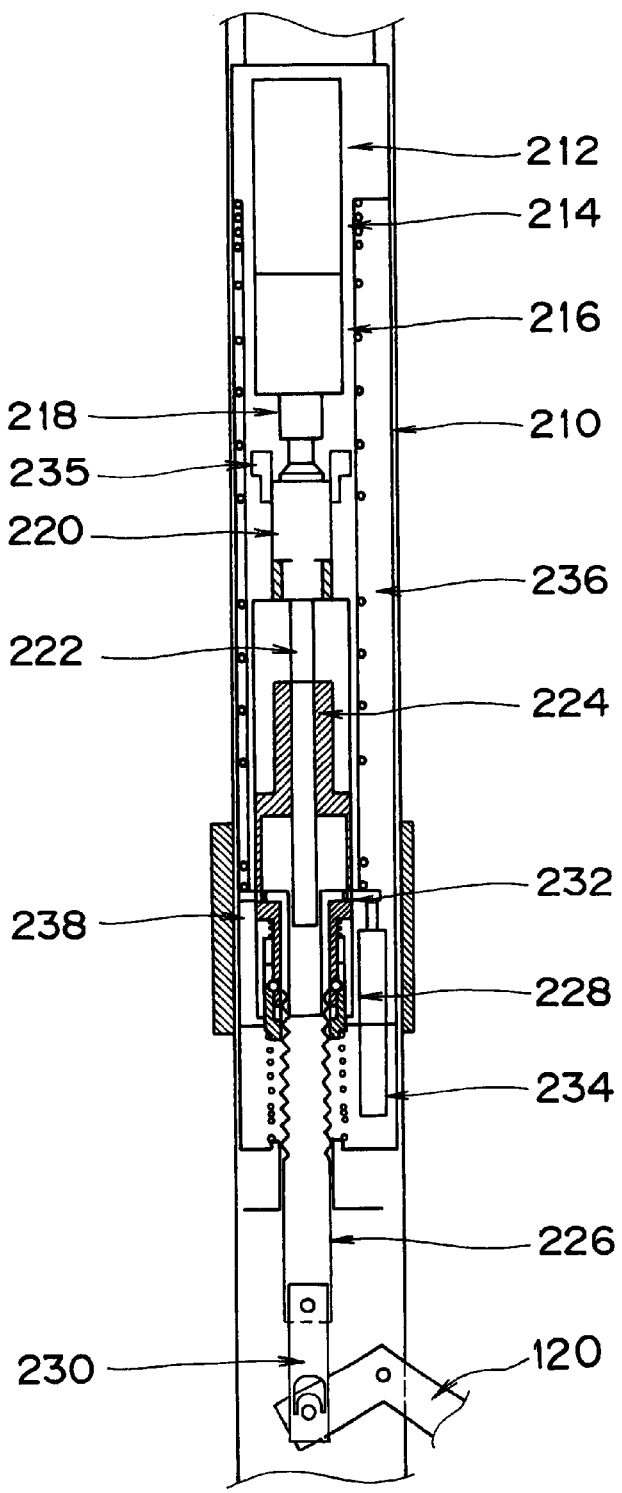

FIG. 3B shows an alternative embodiment wherein measurement devices 235, preferably strain gauges, can be used to measure compressive or tensile force response on the nut 224 to determine the contact force between the anchoring arm 120 and the borehole (140 in FIG. 2). In anchoring, measurement devices 235, preferably strain gauges, can be used to determine the reaction force of the borehole on the anchoring arm. The reaction force is transferred through the anchoring arm 120 to the push rod 226 when the clutch 228 is engaged. Further when anchoring arm 120 is retracted, measurement device 235 can be used to measure response in anchor mechanism 110 which indicates the arm is fully retracted.

FIG. 2 shows an alternate embodiment wherein at least one measurement device 125, preferably a relative bearing measurement device, can be used to measure relative orientation of the tool body in the borehole. One type of relative bearing measurement device includes a pin drum that is attached to the tool body. Gravity positions a pin in the drum and the relative bearing of the tool body is determined by reference to this pin. Measurement device 125 can be used to measure relative orientation of the tool body 100 in a deviated borehole. Measurement device 125 can be used further to measure relative orientation of a deviated borehole when tool body 100 is anchored against the borehole. Multiple measurement devices 125 can be used to determine the 3-D orientation of the tool body.

In FIG. 3, extension of the push rod 226 by the spring 236 is limited by either the arm contacting the borehole wall or by the base section 232 reaching the stops 238 positioned in the body (fully extended). Once the arm contacts the borehole wall, the nut 224 moves over the push rod 226 to activate the clutch 228 such that the screw 222 and nut 224 drives the push rod 226 directly and forces it against the borehole wall to anchor the tool or shuttle.

To release the arm, the motor is reversed and the screw 222 retracts the nut 224, releasing the clutch 228. The arm is then only held against the borehole wall by the spring 236 and so can move in or out as the tool or shuttle is moved to a different position in the well. It is not necessary to retract the arm completely. If it is desired to retract the arm completely, the reverse motor drive is continued and the nut 224 is retracted along the screw 222 until it contacts the base section 232 of the push rod 226 which it then pulls back against the action of the spring 236 to retract the push rod 226 and thus the anchor arm. When the arm is fully retracted, the motor stalls and this is detected to find the fully retracted/closed position of the arm. Measurement device 235 (in FIG. 3B) can be used to detect or confirm the fully retracted/closed position of the anchor arm 120.

The clutch mechanism 228 (shown in more detail in FIG. 4A) is formed by the outer end of the nut 224 through which the push rod 226 projects and a collar 240 located in the tool body 210 around the push rod 226 by a spring 242. The outer end of the nut has a number of seats 244 each having a ball bearing 246 located inside. A retaining ring 248 prevents the balls 246 from falling out of the seats 244. A number of grooves 250 are formed in the outer surface of the push rod 226. As the end of the nut moves over the push rod 226 after it has contacted the wall of the borehole, the balls 246 are free to move in and out of the grooves 250 without inhibiting movement of the nut 224, until the outer end of the nut 224 contacts the collar 240 (FIG. 4C). Once seats 244 reach grooves 250, spring 242 biases collar 240 to drop ball 246. At this point, once the balls 246 drop into groove 250, the collar is allowed to move over the seats and prevent the balls 246 from moving out of the groove 250. Further motion of the nut 224 is transmitted to the push rod 226 by the balls 246 engaged in the groove 250 to provide the anchoring force for the arm (FIG. 4D). Reversing the motor drive retracts the nut 224 from the collar 240 so allowing the balls to move out of the groove 250 and permit the push rod to move back against the spring 236. The motion of the nut required to activate the clutch between first contacting the collar 240 and driving or releasing the push rod 226 is small, for example in the order of 3 mm. Thus the time to lock and unlock the arm is small and has less impact on the time taken to move the shuttle between measurement locations.

In this arrangement, all of the drive mechanism and springs are located within the shuttle body with only simple mechanical linkages exposed. This is to be contrasted with the prior art mechanism which has the leaf spring outside the tool. Also, eliminating the clutch and engagement mechanism between the motor and the screw and implementing the clutch between the nut and the push rod in the manner described above allows a shorter overall length.

FIG. 5A shows link 230 in detail. Link 230 comprises hole 260 through which the link is connected by a fastener to the push rod (226 in FIG. 3A) and orifice 262 through which the link is connected by a pivot to the anchor arm (120 in FIG. 2). Pivots and fasteners may be pins, rivets, screws, bolts, or other means of connection. Cutout area 264 is proximity placed near orifice 262, thereby forming a breakage area 266. In the event the anchor arm cannot be retracted through typical methods of releasing the arm, the breakage area can be failed. This is done by using applying a force to the push rod connected to the link thereby stressing the link so that the breakage area can be failed by the resistance force applied by the anchor arm 120 to the link 230. The force can be applied to the push rod by the drive mechanism or an outside force can be applied to the tool body. FIG. 5B shows link 230 after breakage area 266 has been failed wherein orifice 272 comprises cutout area 264 and hole 262. FIGS. 5C and 5D shows some possible positions of pivot 274 attaching anchor arm 120 in orifice 272 after failure of breakage area 266. The range of positions provides freedom of movement of pivot 274 controlled within orifice 272. This freedom of movement can permit movement of the anchor arm sufficient to permit the arm to be retracted. The dimension of orifice 272 can be such that link 230 is operational even after the breakage area has failed and pivot is confined in orifice 272.

In this arrangement, encumbered or jammed tools or shuttles can be unencumbered or released by failing the breakage area. Further this arrangement provides for operation and use of the tool and anchoring arm after such failure has occurred.

INDUSTRIAL APPLICABLITIY

The present invention finds application in the field of borehole logging tools, particularly seismic multi-shuttle logging tools which can be used to evaluate the formations surrounding boreholes such as are drilled for the extraction of hydrocarbons or geothermal energy.

What is claimed is:

1. A borehole tool comprising a tool body having an anchoring mechanism, the anchoring mechanism comprising:
    a) a drive mechanism including a motor, a drive shaft and a clutch mechanism;
    b) an anchoring arm moveable between first and second positions relative to the tool body; and
    c) a push rod extending through the clutch mechanism connecting the anchoring arm to the drive mechanism; the push rod engaging a spring which acts to bias the arm into the first position, and driveably connecting the drive mechanism through the clutch such that the arm can be moved between the first and second positions.

2. A tool as claimed in claim 1, wherein the clutch mechanism comprises a collar having a number of balls which engage grooves in the push rod to allow the drive mechanism to move the arm.

3. A tool as claimed in claim 2, wherein the clutch mechanism comprises a spring-loaded retaining ring which causes the balls to be held in a driving position in the grooves when engaged by the collar.

4. A tool as claimed in claim 1, wherein the drive shaft comprises a drive screw which acts on the clutch mechanism by means of a nut to transmit drive to the push rod.

5. A tool as claimed in claim 1, wherein the spring comprises a coil spring surrounding at least part of the drive mechanism and wherein the drive mechanisms, push rod and spring are all located within the tool body.

6. A tool as claimed in claim 1, wherein the first position of the arm has the arm extending away from the tool body so as to engage a wall of a borehole in which the tool is positioned, and the second position of the arm has the arm lying close to the tool body.

7. A tool as claimed in claim 6, wherein the drive mechanism is used to control the movement of the arm under the influence of the spring between the first and second positions.

8. A tool as claimed in claim 7, wherein the spring and the drive mechanism operate so as to cause the arm to engage the borehole wall and force the tool body against the opposite side of the borehole wall, the drive mechanism serving to provide extra force to anchor the tool body against the borehole wall.

9. A tool as claimed in claim 8, wherein the drive mechanism can be reversed to disengage the clutch mechanism and remove the extra force from the arm such that said arm engages the borehole wall under the influence of the spring only.

10. A borehole tool comprising a tool body having an anchoring mechanism, the anchoring mechanism comprising:
    a) a drive mechanism including a motor, a drive shaft and a clutch mechanism;
    b) an anchoring arm moveable between first and second positions relative to the tool body; and
    c) a push rod extending through the clutch mechanism connecting the anchoring arm to the drive mechanism through a link; the push rod engaging a spring which acts to bias the arm into the first position, and driveably connecting the drive mechanism through the clutch such that the arm can be moved between the first and second positions.

11. A tool as claimed in claim 10, wherein the clutch mechanism comprises a collar having a number of balls which engage grooves in the push rod to allow the drive mechanism to move the arm.

12. A tool as claimed in claim 11, wherein the clutch mechanism comprises a spring-loaded retaining ring which causes the balls to be held in a driving position in the grooves when engaged by the collar.

13. A tool as claimed in claim 10, wherein the drive shaft comprises a drive screw which acts on the clutch mechanism by means of a nut to transmit drive to the push rod.

14. A tool as claimed in claim 10, wherein the spring comprises a coil spring surrounding at least part of the drive mechanism and wherein the drive mechanisms, push rod and spring are all located within the tool body.

15. A tool as claimed in claim 10, wherein the first position of the arm has the arm extending away from the tool body so as to engage a wall of a borehole in which the tool is positioned, and the second position of the arm has the arm lying close to the tool body.

16. A tool as claimed in claim 15, wherein the drive mechanism is used to control the movement of the arm under the influence of the spring between the first and second positions, and can also act to further urge the arm to the first position so as to apply force to the borehole wall.

17. A tool as claimed in claim 16, wherein the spring and the drive mechanism operate so as to cause the arm to engage the borehole wall and force the tool body against the opposite side of the borehole wall, the drive mechanism serving to provide extra force to anchor the tool body against the borehole wall.

18. A tool as claimed in claim 17, wherein the drive mechanism can be reversed to disengage the clutch mechanism and remove the extra force from the arm such that said arm engages the borehole wall under the influence of the spring only.

19. A tool as claimed in claim 10, wherein the link comprises a cut-out area.

20. A tool as claimed in claim 10 wherein the link comprises a breakage area.

21. A tool as claimed in claim 10, further wherein the link comprises an orifice wherein a pivot connecting the anchor arm to the link is positioned.

22. A tool as claimed in claim 20, wherein the breaking area can be failed by a force asserted by the anchor arm in resistance to a force provided by the push rod.

23. A tool as claimed in claim 22 wherein the anchor arm remains movable between a first and second position after the breaking area has been failed.

24. A borehole tool comprising a tool body having an anchoring mechanism, the anchoring mechanism comprising:

a) a drive mechanism including a motor, a drive shaft and a clutch mechanism;

b) an anchoring arm moveable between first and second positions relative to the tool body; wherein the anchor arm engages a borehole wall; and c) a push rod connecting the anchoring arm to the drive mechanism; the push rod engaging a spring which acts to bias the arm into the first position, and driveably connecting the drive mechanism through the clutch such that the arm can be moved between the first and second positions; and d) at least one measurement device.

25. A tool as claimed in claim 24 further comprising a link connecting the anchoring arm to the drive mechanism.

26. A tool as claimed in claim 24, wherein said measurement device measures contact of the anchor arm with the borehole wall.

27. A tool as claimed in claim 24, wherein said measurement device is a potentiometer.

28. A tool as claimed in claim 24, wherein measurement device determines force asserted by the anchor arm on the borehole wall.

29. A tool as claimed in claim 24, wherein said measuring device is a strain gauge.

30. A tool as claimed in claim 24, wherein said measuring device measures tool orientation.

31. A tool as claimed in claim 30, wherein said measuring device is a relative bearing measurement device.

* * * * *